United States Patent [19]

Gorman et al.

[11] Patent Number: 4,961,622
[45] Date of Patent: Oct. 9, 1990

[54] OPTICAL COUPLER AND REFRACTIVE LAMP

[75] Inventors: Michael A. Gorman; Mark H. Sterling; Robert M. Kiehn; Lowell T. Wood, all of Houston, Tex.

[73] Assignee: University of Houston - University Park, Houston, Tex.

[21] Appl. No.: 312,624

[22] Filed: Feb. 17, 1989

Related U.S. Application Data

[63] Continuation-in-part of Ser. No. 160,164, Feb. 25, 1988, Pat. No. 4,834,484, which is a continuation-in-part of Ser. No. 71,493, Jul. 9, 1987, Pat. No. 4,842,393.

[51] Int. Cl.$^5$ .......................... G02B 6/32; G02B 3/00; F21V 5/00; H04B 9/00
[52] U.S. Cl. .............................. 350/96.18; 350/96.15; 350/96.16; 350/96.20; 350/96.22; 350/432; 350/436; 350/440; 350/413; 362/32; 362/335; 362/336; 370/1; 370/3
[58] Field of Search ............. 350/96.15, 96.16, 96.18, 350/96.20, 96.10, 96.31, 96.22, 413, 432, 438, 433, 440, 434, 436, 258, 259, 261, 262, 265; 362/32, 317, 326, 335, 336; 370/3, 1

[56] References Cited

U.S. PATENT DOCUMENTS

| | | | |
|---|---|---|---|
| 2,133,378 | 10/1938 | Cullman | 240/93 |
| 2,474,327 | 6/1949 | Rolph | 240/106 |
| 2,732,488 | 1/1956 | Wince | 240/93 |
| 2,759,393 | 8/1956 | McLeod | 350/432 |
| 3,419,321 | 12/1968 | Barber et al. | 350/432 X |
| 3,534,462 | 10/1970 | Cruickshank | 29/471.1 |
| 3,547,526 | 12/1970 | Devereux | 350/96.18 |
| 3,848,970 | 11/1974 | Goodell | 350/432 X |
| 3,937,557 | 2/1976 | Milton | 350/96.16 X |
| 3,947,093 | 3/1976 | Goshima et al. | 350/432 X |
| 4,109,998 | 8/1978 | Iverson | 350/574 |
| 4,450,509 | 5/1984 | Henry | 362/216 |
| 4,474,437 | 10/1984 | Gorenstein | 350/432 |
| 4,519,670 | 5/1985 | Spinner et al. | 350/96.18 X |
| 4,593,345 | 6/1986 | Beggs | 362/267 |
| 4,641,915 | 2/1987 | Asakawa et al. | 350/96.18 |
| 4,669,034 | 5/1987 | Bansbach et al. | 362/309 |
| 4,834,484 | 5/1989 | Gorman et al. | 350/96.18 X |
| 4,842,393 | 6/1989 | Gorman et al. | 350/432 |
| 4,854,662 | 8/1989 | Estes et al. | 350/96.20 |
| 4,875,756 | 10/1989 | Estes et al. | 350/96.20 |
| 4,892,375 | 1/1990 | Chikuma et al. | 350/96.18 |
| 4,898,439 | 2/1990 | Mori | 350/96.10 |
| 4,900,117 | 2/1990 | Chen | 350/96.15 |

FOREIGN PATENT DOCUMENTS

| | | | |
|---|---|---|---|
| 3205432 | 8/1983 | Fed. Rep. of Germany | 350/96.18X |
| 55-25063 | 2/1980 | Japan | 350/96.16 X |

*Primary Examiner*—Brian Healy
*Attorney, Agent, or Firm*—Pravel, Gambrell, Hewitt, Kimball & Krieger

[57] ABSTRACT

A cuspate lens is disclosed having a slope magnitude which decreases from a maximum at a central cusp to a minimum at the periphery. A radially symmetric version of the lens can focus light into a ring, or produce an annular beam. Also disclosed are a fiber optic coupler and an optical slip ring using the cuspated lenses or other refractive devices capable of producing an annular beam of light, such as axicons or eccentric lenses. Also disclosed is a lamp using a cuspate lens or a multi-faceted version of a cuspate lens.

27 Claims, 10 Drawing Sheets

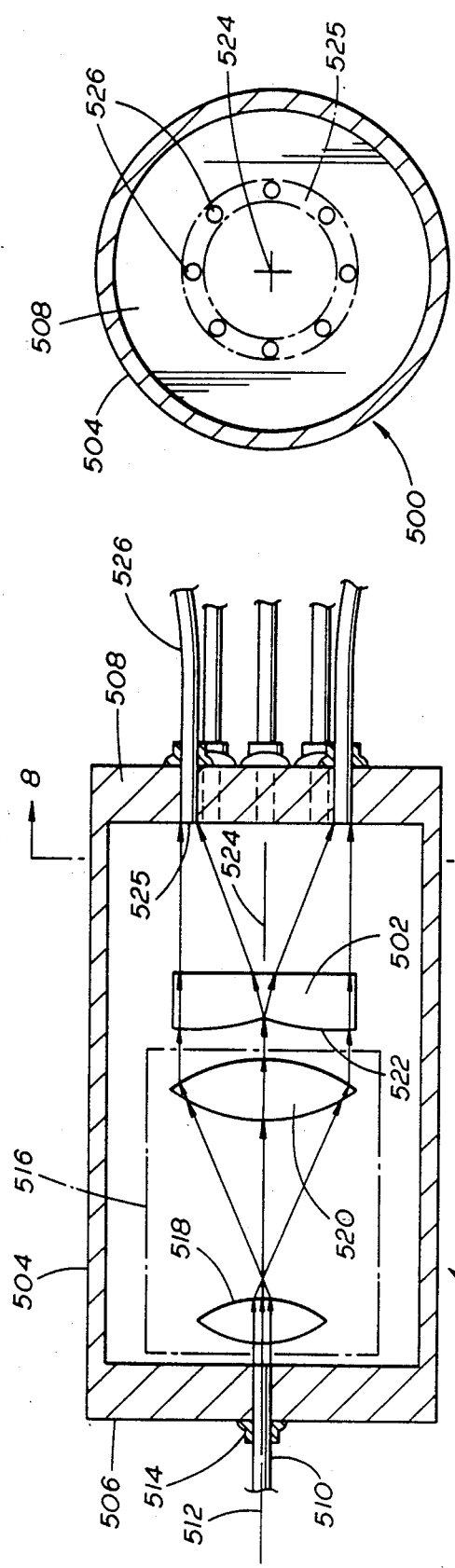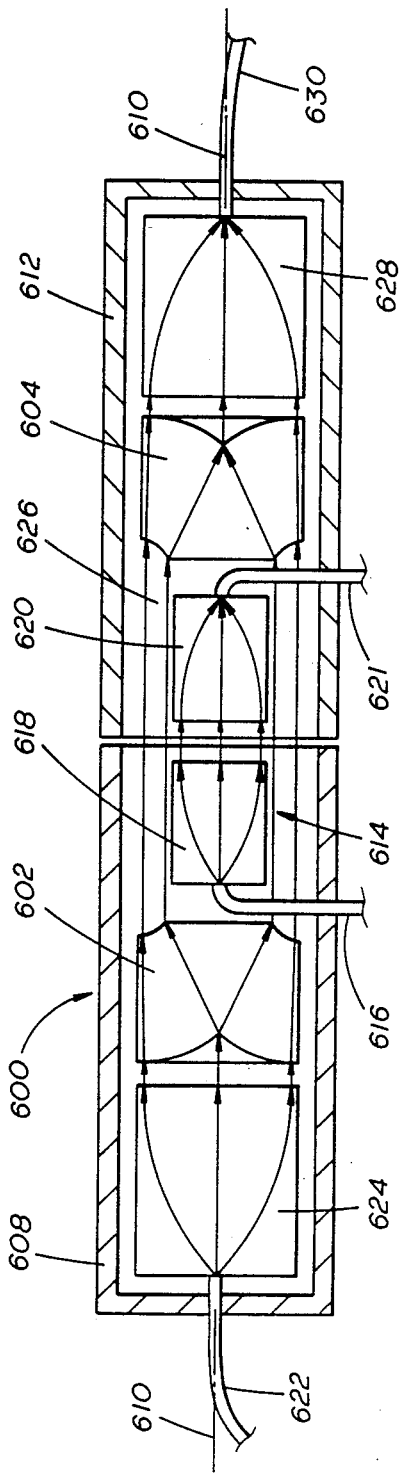

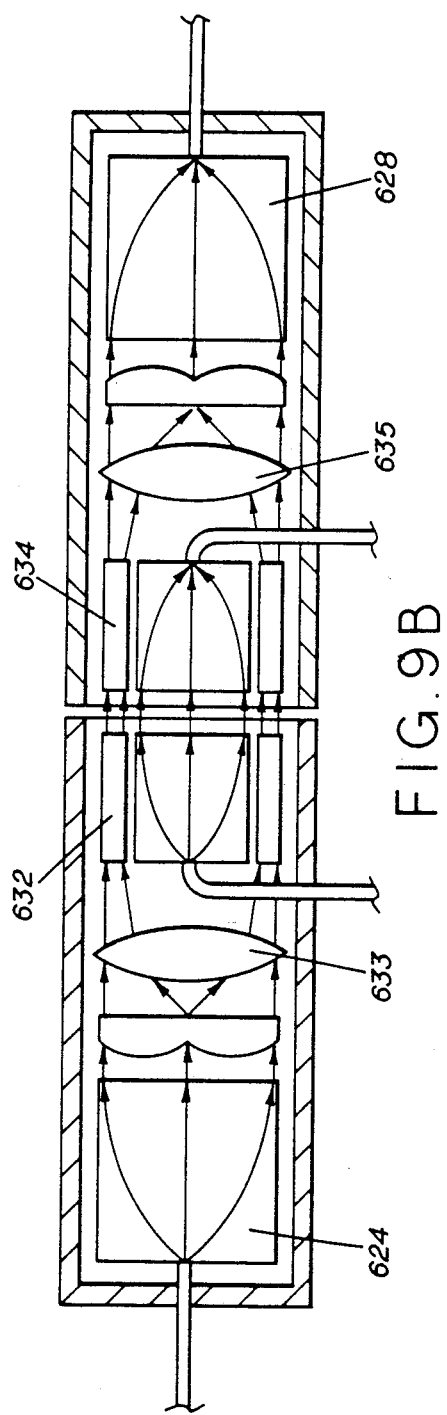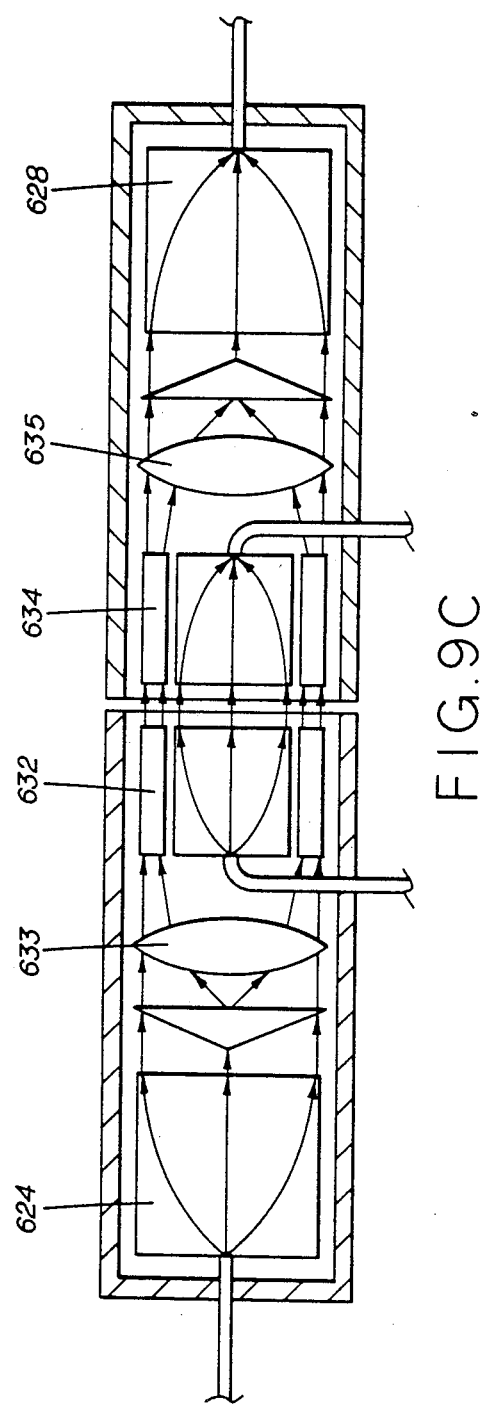

OPTICAL COUPLER AND REFRACTIVE LAMP

This is a continuation-in-part application based on application Ser. No. 160,164 filed Feb. 25 1988, now U.S. Pat. No. 4,834,484 which is a continuation-in-part application based on application Ser. No. 071,493 filed July 9, 1987, now U.S. Pat. No. 4,842,393.

FIELD OF THE INVENTION

This invention relates to application of a cuspate refractive device having a maximum slope magnitude inside the periphery of the device which decreases toward the periphery, and particularly to a cuspate lens which focuses radiation into a ring, which produces an annular beam of parallel radiation, or which refracts light in a distribution away from the optical axis. These devices might also use an axicon or an eccentric lens capable of focusing radiation into a ring or producing an annular beam of light or they might use a Fresnel version of the cuspate lens. The invention specifically relates to a fiber optic coupler and an optical slip ring employing such a cuspate lens or axicon or eccentric lens and to a light source apparatus designed to take advantage of the ability of these refractive elements to produce annular light forms.

BACKGROUND OF THE INVENTION

Couplers for optical fibers in which light is transmitted between one optical fiber and one or more other optical fibers are well known. However, such optic couplers heretofore known have suffered from a drawback in that it has been necessary to fuse the fibers together. Once the fibers are fused, it is difficult to take them apart. Also, it has been difficult to ensure that each fiber receives the same fraction of the incident light. Thus, there is a need for an optical coupler in which it is not necessary to fuse the optical fibers and in which each fiber receives the same fraction of incident light.

Further, currently known lamp designs use masking, such as an opaque lamp shade, to produce desired dark areas within a lighted region. Also, known designs frequently use a shade or translucent fixture to disperse the light so that the harsh glare of the bulb does not directly illuminate the surroundings. Such masking or dispersion is not completely effective at excluding light, and diffusion of the transmitted light frequently results in areas of varying light intensity.

SUMMARY OF THE INVENTION

The present invention provides an optical fiber coupler including means for receiving a transmissive end of a first optical fiber, means for receiving transmissive ends of a plurality of second optical fibers in a circular arrangement and defining a ring with a radial width corresponding to a transverse dimension of the second optical fibers, and means including a cuspate lens or axicon or eccentric lens for conservatively transmitting light between the end of the first optical fiber and the ring.

The principles of the invention are also useful in an optical slip ring having at least two channels. The slip ring includes first and second opposed housings rotatable with respect to each other about a common axis. A first channel includes a first channel optical fiber and first channel beam spreader transmissively associated therewith in each housing. The first channel beam spreaders are coaxially aligned with the housing axis and transmissively opposed in the respective housings. A second channel includes a second channel optical fiber, and a second channel beam spreader and a cuspate lens, axicon or eccentric lens, transmissively associated therewith in each respective housing. The second channel beam spreaders are coaxially aligned with the axis and transmissively disposed between a respective second channel optical fiber and a respective cuspate lens, axicon or eccentric lens. Each cuspate lens, axicon or eccentric lens has a front surface for receiving light from a respective second channel beam spreader and a rear surface for transmitting the received light into an annular beam around the first channel beam spreaders. The rear surfaces of the cuspate lenses, axicons or eccentric lenses, as the case may be, are transmissively opposed in their respective housings.

The principles of the invention also make possible the construction of a light source apparatus for indirect illumination of, for example, living areas. The light source apparatus or lamp produces no light in a circular region below it, along the optical axis, because all of the light is refracted to the side. Such a light source apparatus can refract the light onto a shade, such as in a lamp, or it can refract the light directly onto the walls of a room. Such a shade, if used, can be a cylindrical or open conical translucent fixture illuminated only along its walls, and dark in the center. The cuspate lens, eccentric lens or axicon redistributes the light from a bulb to strike only the fixture walls causing them to glow, with no light being emitted directly from the open end of the globe. The same principle would allow the illumination of the walls of a room without directly illuminating the floor or occupants.

BRIEF DESCRIPTION OF THE DRAWINGS

FIG. 7 is a schematic cross-sectional view of a fiber optic coupler of the present invention using a cuspate lens;

FIG. 8 is a plan view of the device of FIG. 7 as seen along the lines 8—8;

FIG. 9A is a schematic cross-sectional view of a two-channel optic slip ring of the present invention using a cuspate lens;

FIG. 9B is a schematic cross-sectional view of a two channel optic slip ring of the present invention using an eccentric lens;

FIG. 9C is a schematic cross-sectional view of a two channel optic slip ring of the present invention using an axicon;

DETAILED DESCRIPTION OF THE INVENTION

Figure 2:
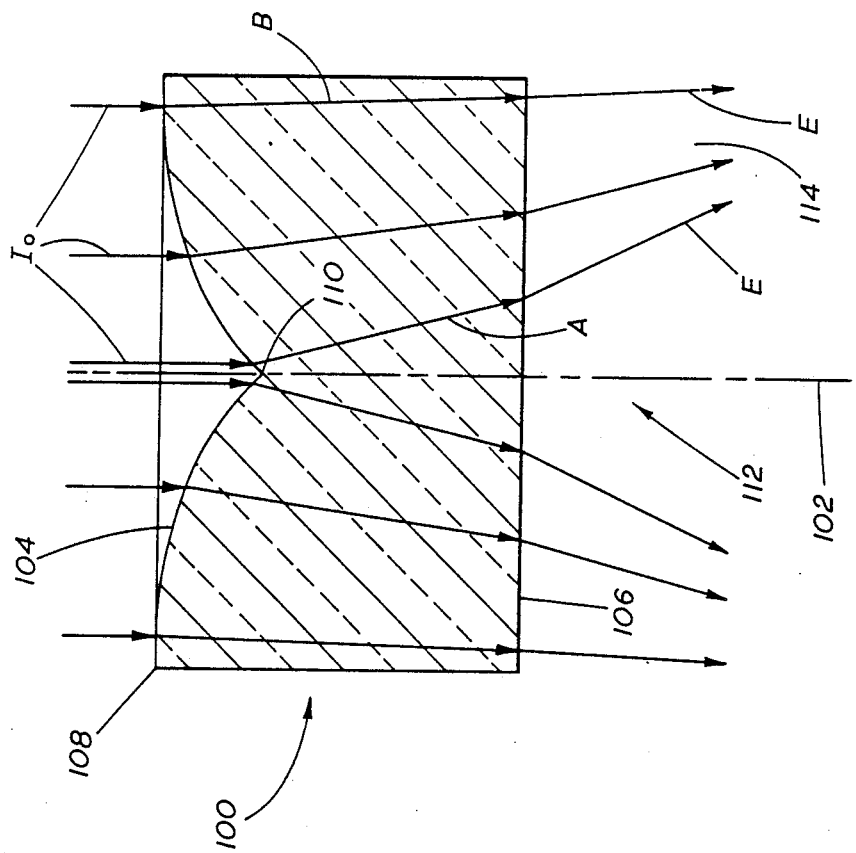
FIG. 2 is a schematic view, partly in cross-section, of the lens of FIG. 1 receiving light from a parallel light source as seen along the lines 2—2.

The coupler of the present invention is contemplated as being useful for the transmission of one or more types of radiation, such as, for example, gamma rays, X-rays, ultraviolet rays, visible light rays, infrared, microwaves, radio waves, sound and ultrasound waves, and the like. As used herein, the term "radiation" also broadly includes beams of particles, such as, for example, electrons, protons, neutrons, alpha particles and the like. The refractive device used is generally made of a material transmissive to the type of radiation desired to be transmitted therethrough. Such materials are known in the art. For convenience, reference is made herein to light and visible light rays for exemplary purposes, but it is to be understood that the refractive device may be suitable for other types of radiation as well, depending on the materials of construction.

As used herein, the term "slope magnitude" is the absolute value of the slope of a lens surface, e.g. the variation of the lens surface dimension taken in a direction parallel to a reference axis or plane with respect to the variation in dimension in a direction normal to the reference. Thus, conventional concave and convex lens surfaces have a slope magnitude of zero at the center which increases to a maximum slope magnitude at their periphery. In contrast, the front surface of the cuspate lens has a maximum slope magnitude inside the area bounded by the periphery, preferably adjacent the cusp, and especially at the cusp, and a slope magnitude which decreases in a direction from the cusp toward the periphery for at least a portion of the distance from the cusp toward the periphery, preferably to a minimum slope magnitude at the periphery, and especially decreasing essentially over the entire distance from the cusp to the periphery. In the eccentric lens, the slope magnitude decreases in a direction from the cusp toward a point part way to the periphery, at which point the slope is zero. The slope magnitude then increases in a direction from this point of zero slope toward the periphery, where the slope magnitude is at a maximum. An example of an axicon is a circular toric lens having on its rear surface an annular protruding ring which refracts light toward the axis of the lens.

As used herein, the term "cusp" is used in the sense of a fixed point on a mathematical curve at which a point tracing the curve would essentially reverse its direction of motion, i.e. the sign of the slope changes and is discontinuous at the cusp. The cusp of the front surface of the refractive device is located at least at the longitudinal axis of the device. The cusp may be, for example, a point at the center of a radially symmetric, circular lens, or at the center of an elliptically shaped lens. Alternatively, the cusp may be a straight line in a lens symmetric with respect to a plane passing through the line, or a curve in an asymmetric refractive device. Further, the cusp may be at the center of a segmented square lens having four quadrants each of which is shaped to focus incident light into a straight line, the four lines being joined to form a square of focused light. Of course, other polygonal shapes are also possible.

Preferably, the refractive device is symmetric. For example, the lens may be radially symmetric with respect to the cusp to generally focus light away from the axis passing through the cusp into a ring at a focal plane around a darkened central area. Or, the lens may have an elliptical periphery and be symmetric with respect to a plane containing the axially aligned cusp to generally focus light at a focal plane, away from an elliptical area into an elliptical ring around the darkened elliptical central area. Alternatively, the device may have a front surface with a linear cusp extending from one peripheral side to an opposite peripheral side and be symmetric with respect to the cusp to focus incident radiation at a focal plane into two parallel lines away from the area between the parallel lines.

In a preferred embodiment, essentially all of the incident light entering the front surface of the refractive device is transmitted "conservatively" through the rear surface. Thus, in contrast to other optical devices in which light is excluded from a central region by blocking transmission with an opaque surface or material, the refractive device used in the present invention conserves the incident light and focuses or refracts essentially all of the light to the periphery of the area from which the transmitted light is excluded.

Figure 1:
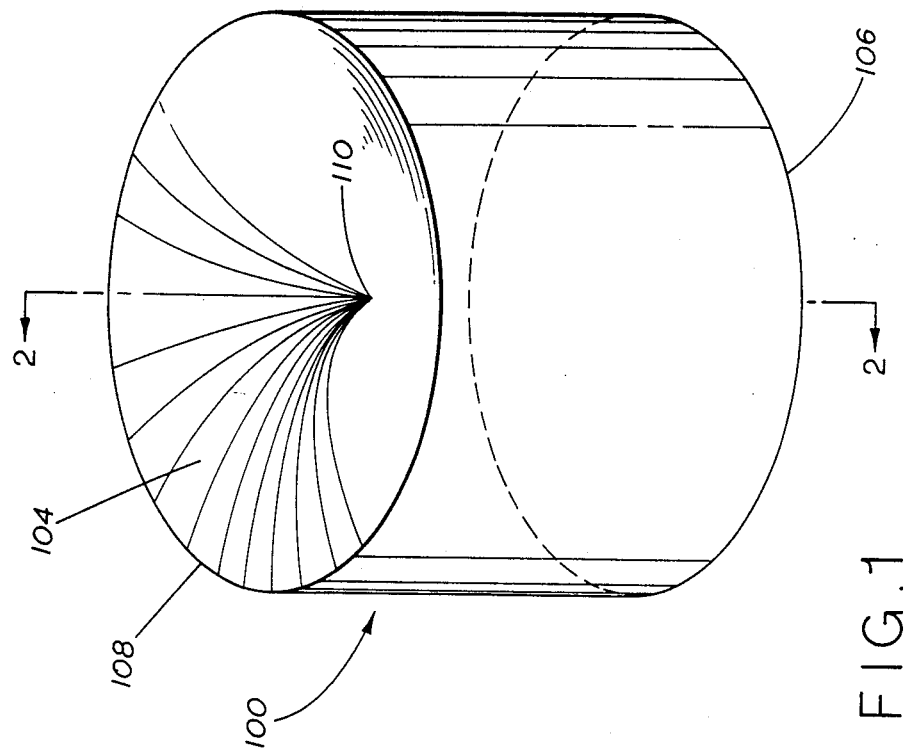
FIG. 1 is a perspective view of a cuspate lens.

Referring now to FIGS. 1 and 2, there is shown a refractive device or lens 100 made by conventional lens manufacturing techniques such as lathing or molding of an optically transmissive material such as, for example, glass, polymethylmethacrylate or the like. The lens 100 has a central longitudinal axis 102, front surface 104, and rear surface 106. The front surface 104 extends laterally from axis 102 toward periphery 108 and is radially symmetric with respect to axis 102. The surface 104 has a cusp 110 at axis 102. The slope magnitude is greatest at the cusp 110 and decreases from the cusp 110 to a minimum at the periphery 108.

In operation, the lens 100 receives incident light $I_0$ shown oriented parallel with respect to axis 102 but which can come from a point source. The light $I_0$ is bent or refracted at the front surface 104. The path through lens 100 of the light $I_0$ refracted at surface 104 depends on the angle of the surface 104 through which the light $I_0$ is received and the refractive index of the lens material. However, the decreasing slope magnitude of the surface 104 generally refracts the light $I_0$ away from the axis 102. For example, path A followed by the light $I_0$ received at the surface 104 adjacent the cusp 110 is bent more sharply away from the axis 102 than the light $I_0$ received at the surface 104 adjacent the periphery 108 which follows a path B substantially parallel to axis 102. The result is that the light E transmitted through the surface 106 is generally refracted away from the axis 102 producing a darkened central circle 112 from which the light E is generally excluded and a generally bright ring 114. The lens 100 may or may not have a focal plane, depending on the geometry of the front surface 104, the refractive properties of the material of which the lens 100 is made, and the geometry of rear surface 106. If a point source is used, the geometrics of the front and rear surfaces must be designed accordingly to either achieve or avoid focusing.

Figure 3:
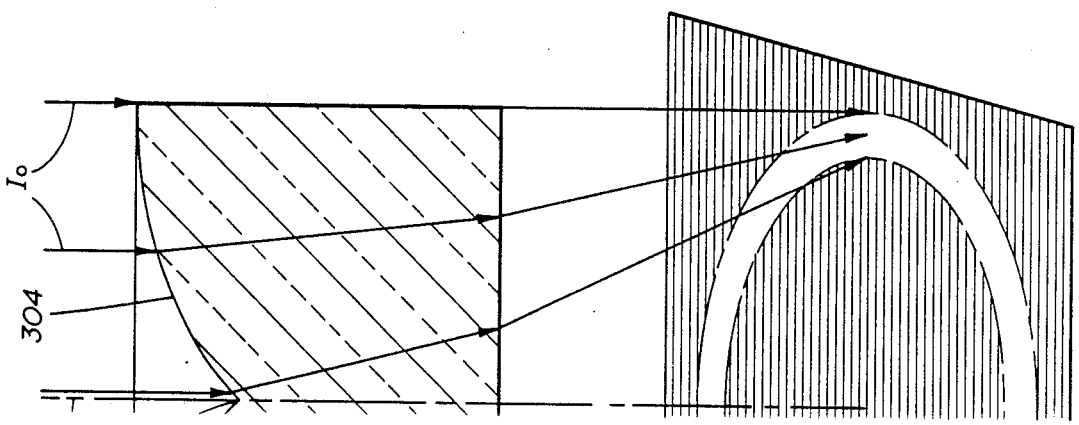
FIG. 3 is a schematic view, partly in cross-section, of a radially symmetric lens with an annular focal plane.

In FIG. 3, there is illustrated a radially symmetric lens 300 having an axis 302, front surface 304, rear surface 306, periphery 308 and cusp 310 essentially as described above with reference to FIGS. 1 and 2. However, taking into account the refractive index of material of lens 300 and the flat geometry of the rear surface 306, the geometry of surface 304 is designed to focus the incident light $I_0$ conservatively, that is, without diffusion, into ring or annulus 320 at focal plane 322. By altering the geometry of surface 304, the focal plane 322 may be axially disposed as desired.

Figure 5:
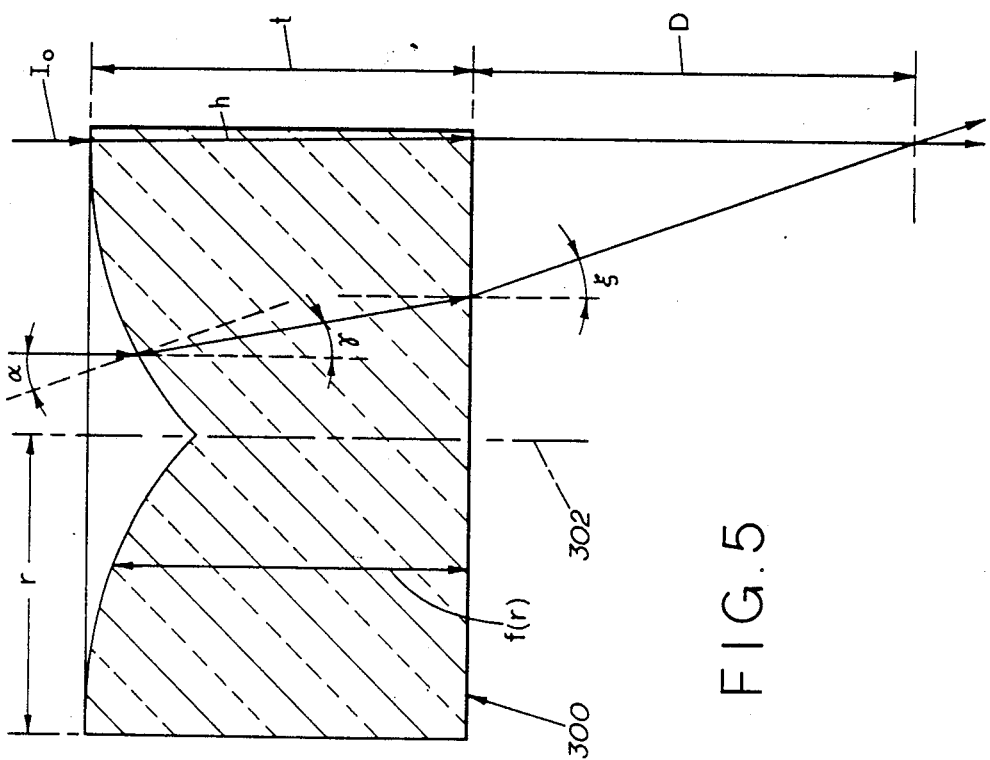
FIG. 5 is a schematic cross-sectional view of the lens of FIG. 3 illustrating variables in the optical path length equation.

Generation of a surface profile for the front surface of a radially symmetric cuspate lens with an annular focal plane, having parallel incident light, such as the lens illustrated in FIG. 3, is done by solving the optical path length (OPL) equation therefor:

$$OPL = [t - f(r)] + n[f(r)/COS\ \gamma] + [D/COS\ \xi] \qquad (1)$$

wherein [with reference to FIG. 5 for an illustration of the variable] t is the thickness of the lens at the periphery, f(r) is the functional form of the surface, n is the refractive index, $\gamma$ is the angle of the path of the ray inside the lens to the lens axis, and $\xi$ is the angle of the transmitted light to the normal of the rear surface. Such an equation for use with a point source of light would constitute an incremental series of these equations corresponding to an incremental series of incident light angles. This equation for parallel light is much simpler and sufficient for purposes of illustration. Since $\alpha = tan^{-1}[f'(r)]$, wherein $f'(r) = df/dr$ and $\alpha$ is the angle between the incident ray and the normal to the lens surface, it can be shown that $$\gamma = tan^{-1}[f'(r)] - sin^{-1}\{[sin(tan^{-1}[f'(r)])]/n\}; \text{ and} \qquad (2)$$

$$\xi = sin^{-1}(n\ sin\ \gamma). \qquad (3)$$

By rearranging equation (1), $$f(r) = [OPL - t - Dsec\xi]/[nsec\gamma - 1]. \qquad (4)$$

Equation (4) is difficult to solve mathematically, but its solution can be approximated by numerical methods. An exemplary Fortran computer program for numerically solving equation (4) is as follows:

```
       PROGRAM CUSP1
       REAL R, DR, F, FP, LF, FF, CF, CF1, ETA, GAMMA, N, T, D
       REAL Q, RR, RRR, RAD
       WRITE (6,10)
10     FORMAT (1X, 'RADIUS(mm)=')
       READ (5,20) R
20     FORMAT (F15.7)
       WRITE (6,11)
11     FORMAT (1X, 'STEPSIDE(mm)=')
       READ (5,20) DR
       WRITE (6,12)
12     FORMAT (1X, 'THICKNESS(mm)=')
       READ (5,20) T
       WRITE (6,13)
13     FORMAT (1X, 'FOCAL DISTANCE(mm)=')
       READ (5,20) D
       WRITE (6,14)
14     FORMAT (1X, 'n=')
       READ (5,20) N
       RAD=R
       RR=0
       FP=0
       F=T
       RRR=RR+RAD
       WRITE (6,15)
15     FORMAT (1X, '(Coordinates of surface profile referenced to')
       WRITE (6,10)
16     FORMAT (1X, 'an origin on the lens axis at the rear surface.)')
       Q=T-F
       WRITE (6,17)
17     FORMAT (1X, ' r(mm) f(r) (mm)')
       WRITE (6,100) RRR, F
100    FORMAT (F20.2,F13.2)F13.4,F13.4)
       R=R-DR
       RR=RR-DR
       F=F-FP*DR
       LF=F
       Q=T-LF
150    RRR=RR+RAD
       WRITE (6,100) RRR, LF
       R=R-DR
       RR=RR-DR
       FF=LF
       F=LF
       LF=F
       Q=T-LF
       FP=FP+.0001
       F=FF-FP*DR
       GAMMA=ATAN(FP)-ASIN(SIN(ATAN(FP))/N)
       ETA=ASIN(N*SIN(GAMMA))
```

```
    PROGRAM CUSP1
```

```
        CF=(N−1.)*T+(1.−1./COS(ETA))*D
        CF1=CF/((N/COS(GAMMA))−1.)
        IF (CF1−F−.00001) 300,300,200
300     IF (R) 400,150,150
400     END
```

Using this CUSP1 PROGRAM, the following data output was generated:
RADIUS(mm)=20.
STEPSIZE(mm)=0.5
THICKNESS(mm)=25.
FOCAL DISTANCE(mm)=50.
n=1.49

| (Coordinates of surface profile referenced to an origin on the lens surface at the rear axis.) | |
|---|---|
| r (mm) | f(r) (mm) |
| 20.00 | 25.00 |
| 19.50 | 25.00 |
| 19.00 | 24.98 |
| 18.50 | 24.96 |
| 18.00 | 24.93 |
| 17.50 | 24.88 |
| 17.00 | 24.83 |
| 16.50 | 24.78 |
| 16.90 | 24.71 |
| 15.50 | 24.63 |
| 15.00 | 24.55 |
| 14.50 | 24.46 |
| 14.00 | 24.36 |
| 13.50 | 24.25 |
| 13.00 | 24.14 |
| 12.50 | 24.01 |
| 12.00 | 23.88 |
| 11.50 | 23.74 |
| 11.00 | 23.59 |
| 10.50 | 23.43 |
| 10.00 | 23.27 |
| 9.50 | 23.09 |
| 9.00 | 22.91 |
| 8.50 | 22.72 |
| 8.00 | 22.52 |
| 7.50 | 22.31 |
| 7.00 | 22.09 |
| 6.50 | 21.87 |
| 6.00 | 21.63 |
| 5.50 | 21.39 |
| 5.00 | 21.13 |

-continued

| (Coordinates of surface profile referenced to an origin on the lens surface at the rear axis.) | |
|---|---|
| r (mm) | f(r) (mm) |
| 4.50 | 20.87 |
| 4.00 | 20.60 |
| 3.50 | 20.32 |
| 3.00 | 20.03 |
| 2.50 | 19.73 |
| 2.00 | 19.42 |
| 1.50 | 19.10 |
| 1.00 | 18.77 |
| 0.50 | 18.43 |
| 0.00 | 18.08 |

A cuspate lens was fabricated by machining a polymethacrylate block obtained under the trade designation PLEXIGLAS by a computer-aided lathing process to conform to the profile generated by this program. The resulting lens had a radius of 20 mm, a thickness of 25 mm, a focal distance of 50 mm from the rear surface and a focusing ring width of about 1 mm.

Figure 4:
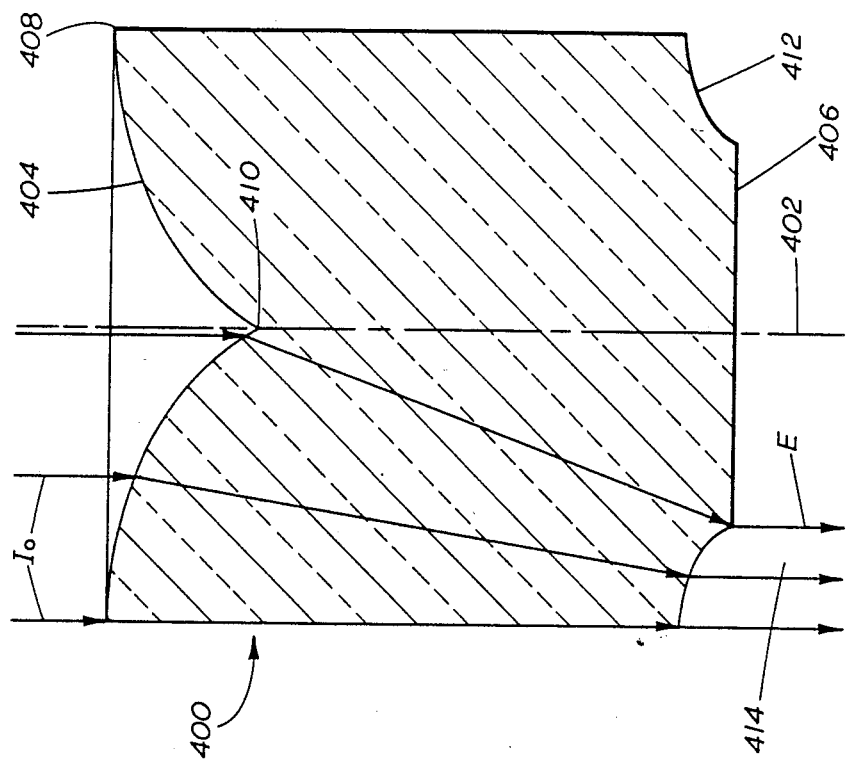
FIG. 4 is a schematic cross-sectional view of a radially symmetric lens producing an annular beam.

Referring to FIG. 4, the radially symmetric cuspate lens 400 has an axis 402, front surface 404, rear surface 406, periphery 408 and cusp 410 essentially as described above with reference to FIG. 3. However, the front surface 404 has a geometry such that the incident light $I_0$ is refracted to an annular section 412 of the rear surface 406. The annular section 412 has a slope geometrically similar to that of the front surface 404 so that the light E is emitted therefrom conservatively, or without loss, oriented in the same direction as the incident light $I_0$, which in the case shown is parallel to axis 402. Thus, the lens 400 produces an annular beam 414.

Figure 6:
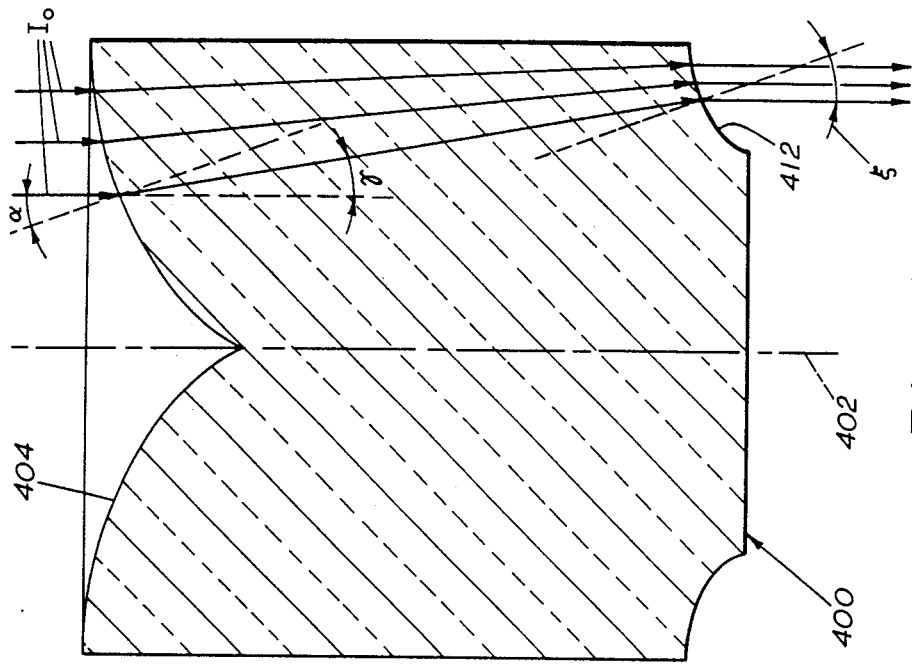
FIG. 6 is a schematic cross-sectional view of the lens of FIG. 4 illustrating a theoretical model for calculation of the lens surface profiles.

A Fortran computer program based on geometric ray tracing equations using variables as illustrated in FIG. 6 for the radially symmetric cuspate lens 400 of FIG. 4 producing an annular beam is as follows:

```
        PROGRAM ANNULAR
        REAL T, N, DR, R, W, GAMMA, FR, FPR, TP, RP
        REAL FPRL, RPL, TPL, RAD, OCR, OCFR, OCTP, OCRP, OTP
        WRITE (6,10)
10      FORMAT (1X, 'RADIUS(mm)=')
        READ (5,20) RAD
20      FORMAT (F15.7)
        WRITE (6,11)
11      FORMAT (1X, 'STEPSIZE(mm)=')
        READ (5,20) DR
        WRITE (6,12)
12      FORMAT (1X, 'THICKNESS OF LENS(mm)=')
        READ (5,20) T
        WRITE (6,13)
13      FORMAT (1X, 'APPROXIMATE RING THICKNESS(mm)=')
        READ (5,20) W
        WRITE (6,14)
14      FORMAT (1X, 'n=')
        READ (5,20) N
        WRITE (6,15)
15      FORMAT (1X, 'ORIGIN CORRECTION (mm)=')
        READ (5,20) OTP
        R=0
        FRP=0
        RP=0
```

```
           PROGRAM ANNULAR
           RP=0
           TP=0
           WRITE (6,16)
     16    FORMAT (1X, '(Coordinates of surface profiles referenced to')
           WRITE (6,17)
     17    FORMAT (1X, 'an origin on the lens axis at the rear surface.)')
           WRITE (6,18)
     18    FORMAT (1X,' ')
           WRITE (6,19)
     19    FORMAT (1X,' FRONT SURFACE SLOPE REAR SURFACE')
           WRITE 6,21
     21    FORMAT (1X, ' r (mm) f(r) (mm) r (mm) g(r) (mm)')
           OCR=R+RAD
           OCT=T+OTP
           OCRP=RP+RAD
           OCTP=TP+OTP
           WRITE (6,100) OCR, OCT, FRP, OCRP, OCTP
     100   FORMAT (F13.2,F13.2,F13.2,F13.2,F13.2)
           R=-DR
           TPL=0
           RPL=0
           FPRL=0
     200   FR=(((T+W)/2)**2-R**2)**.5+((T-W)/2)
           FPR=-R/((((T+W)/2)**2-R**2)**.5)
           GAMMA=ATAN(FPR)-ASIN(SIN(ATAN(FPR))/N)
           RP=(R+(FR+FPRL*RPL-TPL)*TAN(GAMMA))/(1+FPRL*TAN(GAMMA))
           TP=TPL-FPRL*(RPL-RP)
           OCR=R+RAD
           OCFR=FR+OTP
           OCRP=RP+RAD
           OCTP=TP+OTP
           WRITE (6,100) OCR, OCFR, FPR, OCRP, OCTP
           RLP=RP
           TPL=TP
           FPRL=FPR
           R=R-DR
           IF (R+RAD) 500,200,200
     500   END
```

Using this PROGRAM ANNULAR, the following data output was generated:

ANNULAR

RADIUS(mm)=20.
STEPSIZE(mm)=0.5
THICKNESS OF LENS(mm)=40.
APPROXIMATE RING THICKNESS(mm)=10.
n=1.49
ORIGIN CORRECTION(mm)=3.00

(Coordinates of surface profile referenced to an origin on the lens surface at the rear axis.)

| FRONT SURFACE | | | REAR SURFACE | |
|---|---|---|---|---|
| r (mm) | f(r) (mm) | SLOPE | r (mm) | g(r) (mm) |
| 20.00 | 43.00 | 0.00 | 20.00 | 3.00 |
| 19.50 | 42.99 | 0.02 | 19.76 | 3.00 |
| 19.00 | 42.98 | 0.04 | 19.53 | 3.00 |
| 18.50 | 42.95 | 0.06 | 19.29 | 2.99 |
| 18.00 | 42.92 | 0.08 | 19.05 | 2.97 |
| 17.97 | 42.87 | 0.10 | 18.82 | 2.95 |
| 17.00 | 42.82 | 0.12 | 18.58 | 2.93 |
| 16.50 | 42.75 | 0.14 | 18.35 | 2.90 |
| 16.00 | 42.68 | 0.16 | 18.12 | 2.87 |
| 15.50 | 42.59 | 0.18 | 17.88 | 2.83 |
| 15.00 | 42.49 | 0.20 | 17.65 | 2.79 |
| 14.50 | 42.39 | 0.23 | 17.42 | 2.74 |
| 14.00 | 42.27 | 0.25 | 17.20 | 2.69 |
| 13.50 | 42.14 | 0.27 | 16.97 | 2.63 |
| 13.00 | 42.00 | 0.29 | 16.75 | 2.57 |
| 12.50 | 41.85 | 0.31 | 16.53 | 2.51 |
| 12.00 | 41.69 | 0.34 | 16.31 | 2.44 |
| 11.50 | 41.51 | 0.36 | 16.09 | 2.37 |
| 11.00 | 41.32 | 0.39 | 15.87 | 2.29 |
| 10.50 | 41.12 | 0.41 | 15.66 | 2.21 |
| 10.00 | 40.91 | 0.44 | 15.46 | 2.12 |
| 9.50 | 40.69 | 0.46 | 15.25 | 2.03 |
| 9.00 | 40.45 | 0.49 | 15.05 | 1.94 |
| 8.50 | 40.20 | 0.52 | 14.85 | 1.84 |
| 8.00 | 39.93 | 0.55 | 14.66 | 1.74 |
| 7.50 | 39.65 | 0.58 | 14.47 | 1.64 |
| 7.00 | 39.35 | 0.61 | 14.29 | 1.53 |
| 6.50 | 39.04 | 0.64 | 14.11 | 1.43 |
| 6.00 | 38.71 | 0.68 | 13.94 | 1.31 |
| 5.50 | 38.37 | 0.71 | 13.77 | 1.20 |
| 5.00 | 38.00 | 0.75 | 13.61 | 1.09 |
| 4.50 | 37.62 | 0.79 | 13.45 | 0.97 |
| 4.00 | 37.21 | 0.83 | 13.30 | 0.85 |
| 3.50 | 36.78 | 0.88 | 13.16 | 0.74 |
| 3.00 | 36.33 | 0.93 | 13.03 | 0.62 |
| 2.50 | 35.85 | 0.98 | 12.91 | 0.51 |
| 2.00 | 35.35 | 1.04 | 12.79 | 0.39 |
| 1.50 | 34.82 | 1.10 | 12.69 | 0.28 |
| 1.00 | 34.25 | 1.17 | 12.59 | 0.18 |
| 0.50 | 33.64 | 1.25 | 12.51 | 0.08 |
| 0.00 | 33.00 | 1.33 | 12.44 | 0.00 |

A cuspate lens producing an annular beam is fabricated by machining a polymethacrylate block to conform to this profile. The resulting lens has a radius of 20 mm, a thickness of 40 mm and produces an annular beam with an inside radius of about 12.4 mm and an outside radius of 20 mm.

The cuspate lens producing an annular beam is useful in the fiber optic coupler and in the optical slip ring of the present invention.

Figure 10:
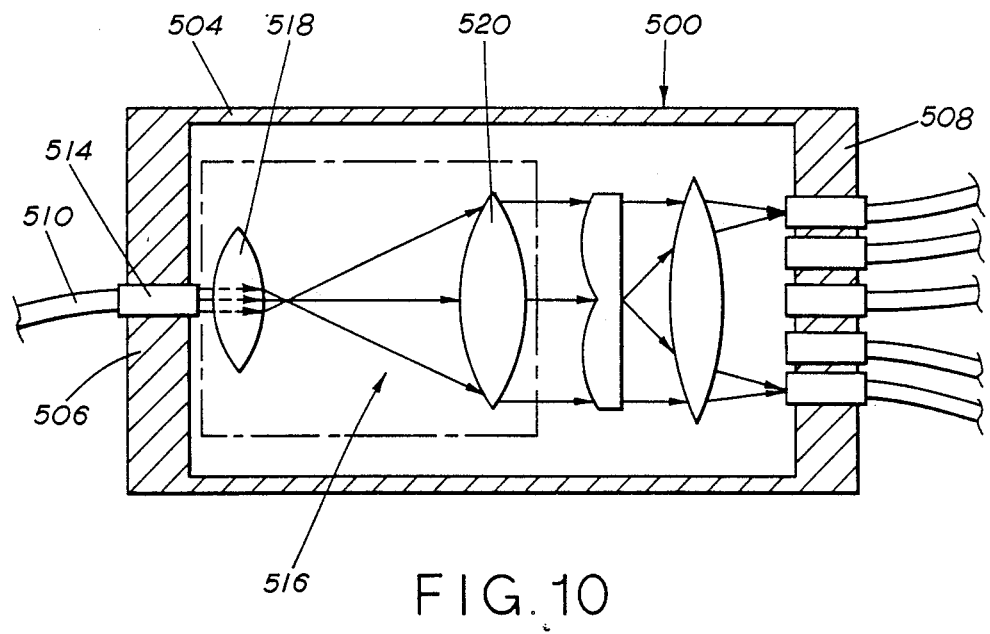
FIG. 10 is a schematic view of a fiber optic coupler of the present invention using an eccentric lens.
Figure 11:
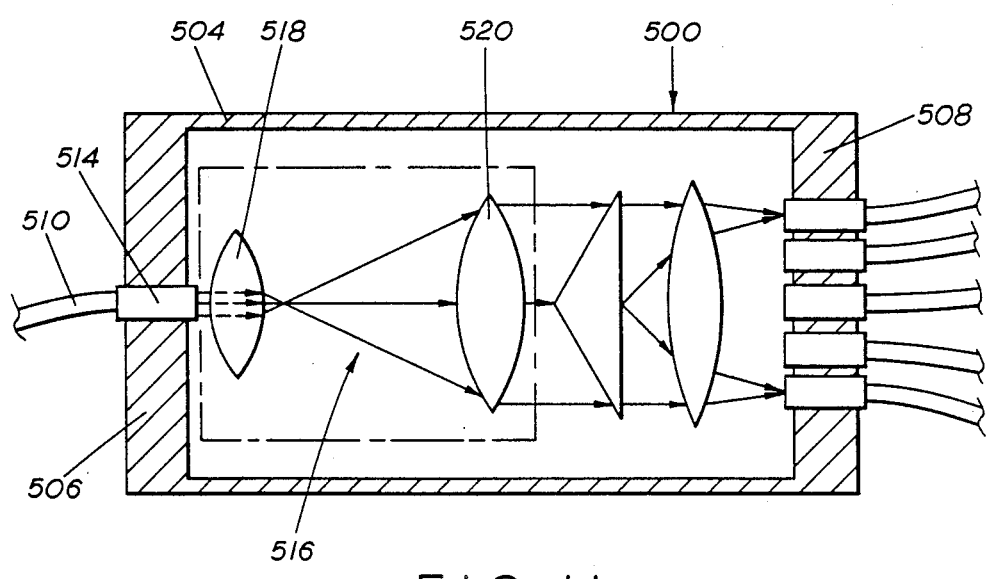
FIG. 11 is a schematic view of a fiber optic coupler of the present invention using an axicon.

Referring now to FIGS. 7 and 8, there is seen a fiber optic coupler 500 employing a cuspate lens 502. The eccentric lens or axicon can similarly be used without departing from the concept of the present invention as shown in FIGS. 10 and 11. The coupler 500 has a housing 504 with a first fiber optic receiving end 506 and a second fiber optic receiving end 508. A source fiber optic 510 is received along a central longitudinal axis 512 in a conventional fiber optic receiver 514. A beam spreader 516 can be positioned as shown to spread light emitted by the fiber optic 510 into a parallel oriented beam of generally circular cross-section or a point source can be used. If a point source is used, no beam spreader is used, but the surfaces of the cuspate lens, eccentric lens or axicon must be shaped accordingly. As shown, the beam spreader 516 comprises first biconvex lens 518 and second biconvex lens 520 coaxially positioned in spaced relation thereto. Alternatively, the beam spreader 516 could be a rod device with a refractive index gradient such as that available from Melles Griot. The lens 502 is disposed in the device 500 to receive a beam of light from the beam spreader 516 at the front surface 522 such that the beam is coaxial with a central longitudinal axis 524 of the lens 502. The lens 502 is designed to focus light into a ring or annulus 525 on second fiber optic receiving end 508 in which a plurality of second fiber optics 526 are received.

Figure 12:
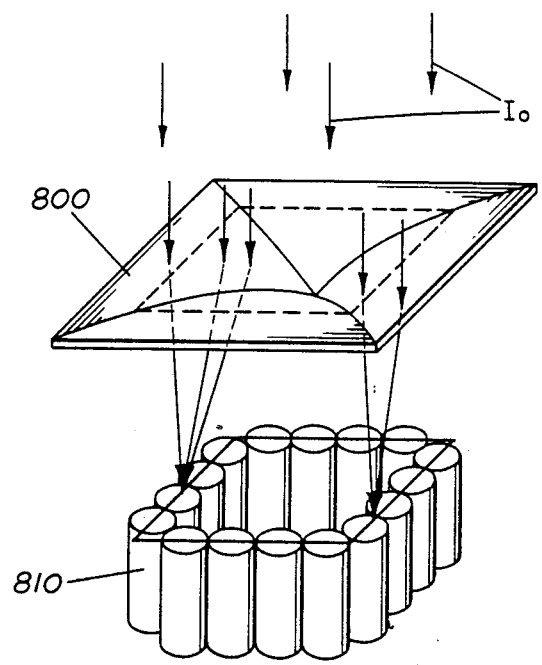
FIG. 12 is a schematic view of a square cuspate lens focusing light on a square array of optical fibers.

In operation, the fiber optic coupler 500 receives an optical signal via the fiber optic 510 which is enlarged in the beam spreader 516. The beam from the beam spreader 516 is received by the cuspate lens 502 and focused conservatively to the ring 525 where the light is received by each of the optical fibers 526 and transmitted thereby. In this manner, each fiber 526 receives the same fraction of incident light. A square cuspate lens 800 could also be used to focus the light signals on a square array of receiving optical fibers 810 as shown in FIG. 12.

It is important that each of the transmissive ends of the optical fibers 510 and 526 be cut at a right angle as is well known in the art. However, any number of the second optical fibers can be employed, up to the number which the endplate 508 is designed to receive. The optical fibers 510 and 526 can be readily removed and/or inserted in the respective receiving ends 506 and 508 since they are mechanically attached rather than welded.

If desired, the device 500 can also be used as an optic slip ring by, for example, permitting the end 508 to rotate with respect to the housing 504. In this embodiment, the end 508 is positioned on a stationary platform and the housing 504 on a platform rotating with respect thereto about the axes 512 and 524, or vice versa.

Referring now to FIG. 9A, there is seen a two-channel optic slip ring 600 employing cuspate lenses 602 and 604. Eccentric lenses or axicons could also be used as shown in FIGS. 9B and 9C. The slip ring 600 has a first housing 608 positioned on a rotating platform (not shown) rotating around an axis 610, and a second housing 612 positioned on a stationary or rotating platform (not shown) such that the housings 608 and 612 rotate with respect to each other. In a first channel 614, a fiber optic 616 is positioned to transmit light to and/or receive light from a beam spreader 618 coaxial with the axis 610. A corresponding coaxial beam spreader 620 is positioned to receive light emitted from and/or transmit light to beam spreader 618, and which is transmissively connected to optical fiber 621. The beam spreaders 618 and 620 are, for example, rod lenses with a graded index of refraction such as those available from Melles Griot.

A second channel is provided in the first housing including optical fiber 622, beam spreader 624 and cuspate lens 602 coaxially aligned to send and/or receive light in an annulus 626 around the beam spreader 618. The corresponding second channel in the second housing 612 is similarly provided with cuspate lens 604, beam spreader 628 and optical fiber 630. Where eccentric lenses or axicons produce a focus ring, toroidal lenses 632, 634 may be used to transmit light from one convex lens 633 to another convex lens 635, as shown in FIGS. 9B and 9C. If desired, additional channels can be provided by using cuspate lenses, eccentric lenses or axicons, which are progressively larger in diameter. Light losses resulting from the fiber optic(s) passing from outside the housings through the transmission annulus of the second channel (and any additional channels) are minimal.

Figure 13:
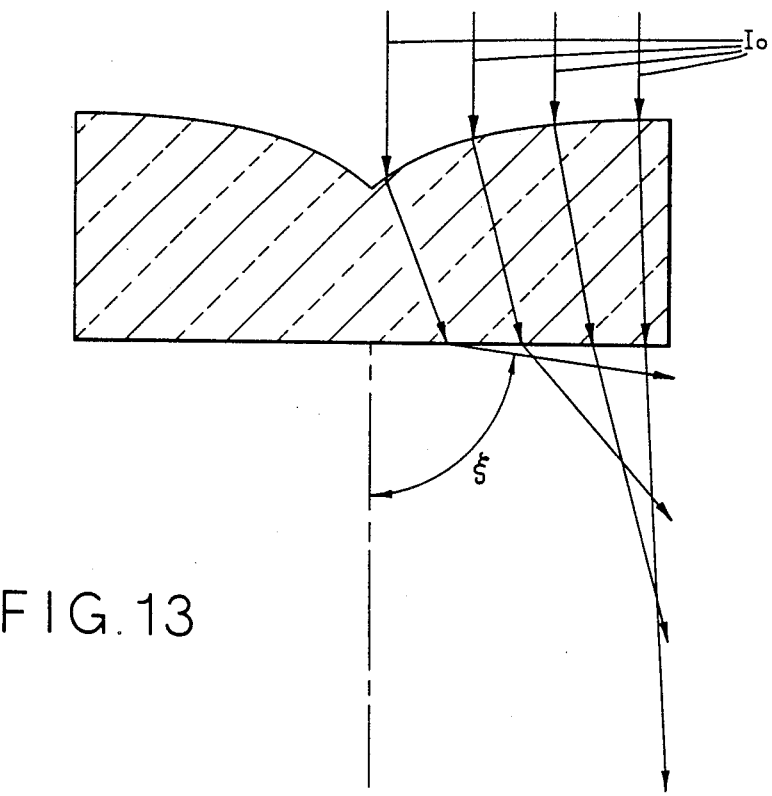
FIG. 13 is a schematic view of the refraction of light away from the axis of one embodiment of a cuspate lens of the present invention.

Rather than focusing all incident light in an annular ring, a cuspate lens can be shaped to spread the light away from the axis of the lens as shown in FIG. 13. Here again, parallel incident light is shown for illustration purposes, but the lens can be shaped to provide essentially the same result from a point source.

Using equation (1) above, the angle $\xi$ is varied incrementally from essentially 90° down to the angle necessary to illuminate the periphery of the desired dark circle. As mentioned before, if a point source is used, the incident light angles would also have to be varied incrementally in solving for the front surface profile.

Figure 14:
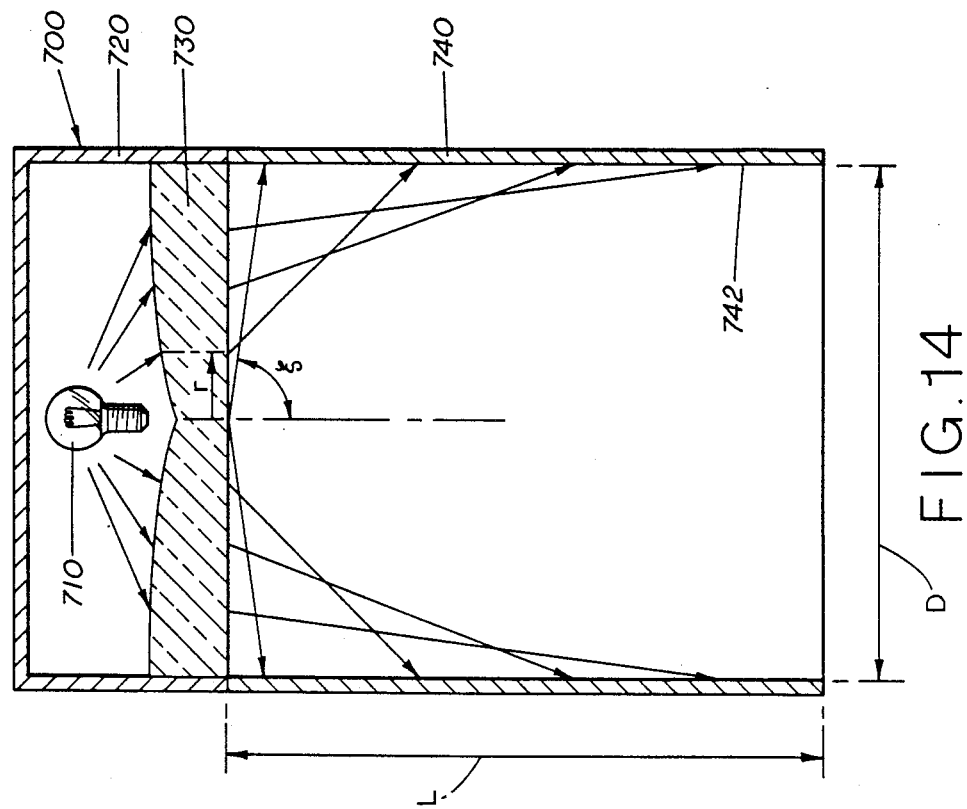
FIG. 14 is a schematic view of the lamp of the present invention using the cuspate lens shown in FIG. 13.
Figure 18:
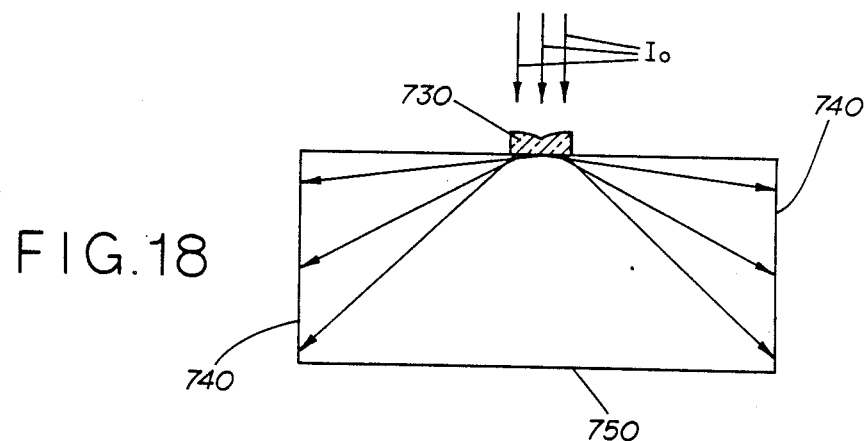
FIG. 18 is a schematic view of the light source apparatus of the present invention, using the cuspate lens shown in FIG. 13 and showing how the walls of a room can be illuminated.

Such a variation of the cuspate lens can be used for example, to create a lamp which excludes light from a region directly below it. Such a lamp can have a translucent shade in the shape of a hollow open ended cylinder as shown in FIG. 14. All of the light emitting from the lamp 700 impinges conservatively on the interior surface 742 of the shade 740; none escapes directly out the end of the cylinder. Rather than being a cylinder, the shade could be a hollow cone, either diverging or converging. Assuming the shade is a cylinder, referring to FIG. 14, using the desired diameter D and length L of the cylinder 740, the angle $\xi$ can be computed which will illuminate the extreme outer end of the shade 740. This value of $\xi$ can be used in equation (1) to compute that incremental portion of the required surface profile of the lens 730. The angle $\xi$ can then be incrementally increased and the surface profile required to uniformly illuminate the shade 740 can be incrementally computed. If desired, the light source apparatus 730 can be provided without a shade or globe to illuminate the walls 740 of a room while shedding no direct light on the floor 750 or occupants, as shown in FIG. 18. Alternatively, the angle $\xi$ can be varied as desired, while radius r increases to produce bands of light and dark on the shade 740 from top to bottom.

Figure 16:
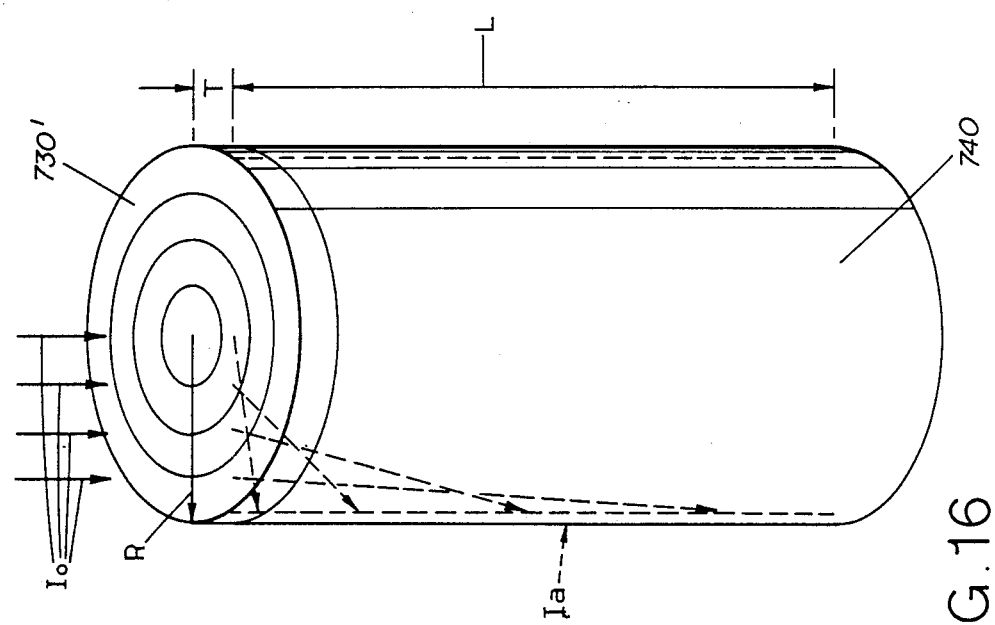
FIG. 16 is a perspective view of the lens of FIG. 15 showing the pattern of illumination.
Figure 15:
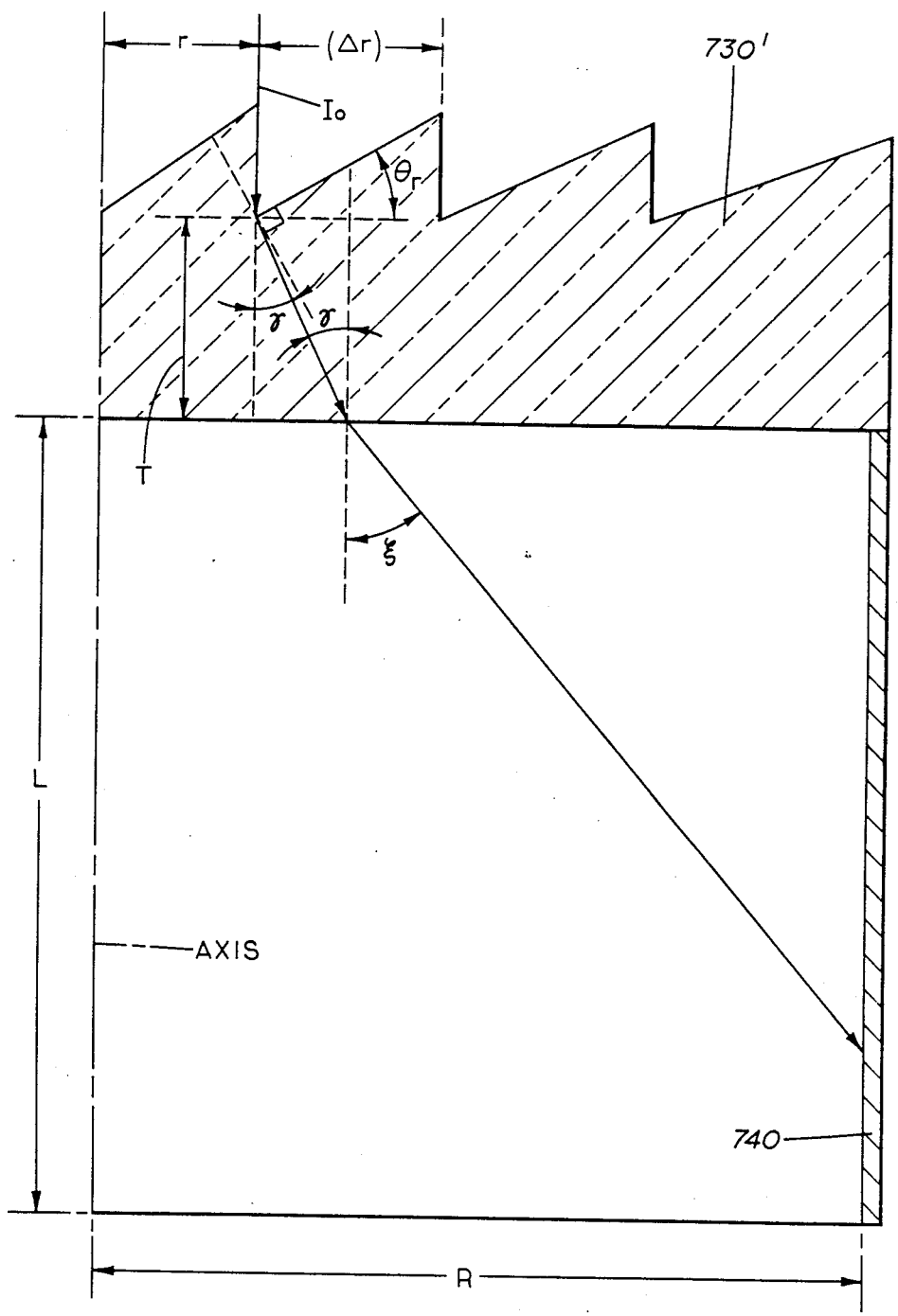
FIG. 15 is a sectional view of a multi-faceted cuspate lens showing the refraction of light.
Figure 17:
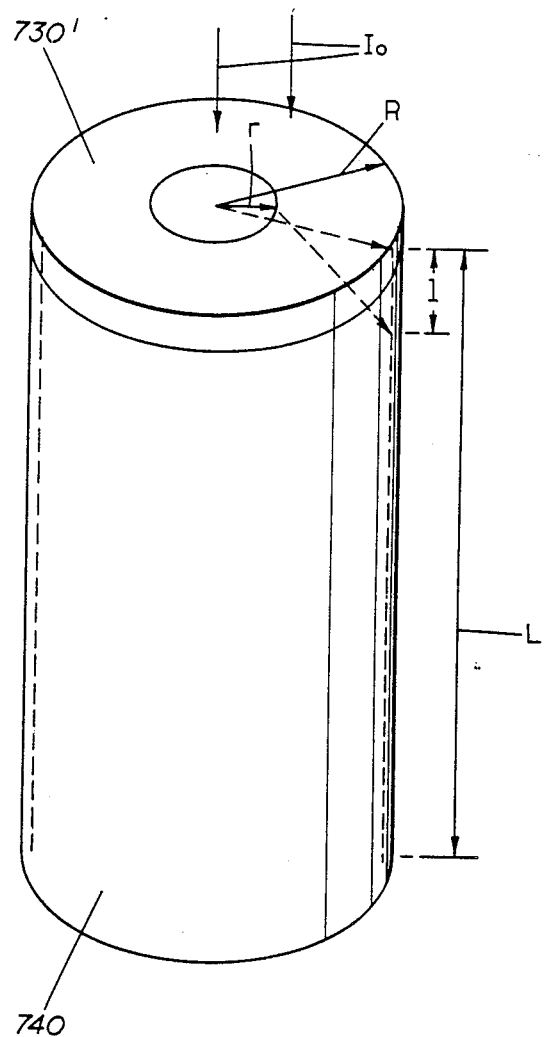
FIG. 17 is a perspective view of the lens of FIG. 15 showing segmental illumination.

Instead of using the cuspate lens to make such a lamp, it is possible to construct a type of multi-faceted Fresnel lens equivalent to the cuspate lens in function. A cross-section of such a Fresnel-cuspate lens 730' is shown in FIG. 15. Assuming again that the incident light is parallel and assuming that uniform illumination of the cylindrical shade 740 is desired, referring to FIG. 16, the intensity of light at every point on the shade is given by the equation:

$$I_s = I_0 \left( \frac{\pi R^2}{2\pi RL} \right) = I_0 \left( \frac{R}{2L} \right) \qquad (5)$$

where $I_s$ is the intensity of light on the shade 740, $I_0$ is the intensity of light incident upon the lens 730′, R is the radius of the lens 730′ and L is the length of the shade 740. Referring to FIG. 17, the relative intensities of incident light on the lens 730′ and light on the shade 740 are shown by the equation:

$$\frac{I_s}{I_o} = \frac{R}{2L} = \frac{\pi r^2}{2\pi Rl} \qquad (6)$$

where r is the radius of a given portion of the lens 730′ and l is the length of shade 740 illuminated by that portion. Solving equation (6) for l:

$$l = \frac{2L\pi r^2}{2\pi R^2} = L \frac{r^2}{R^2} \qquad (7)$$

Using equation (7), the required slope of any segment of the Fresnel-cuspate lens 730′ can be calculated. Referring again to FIG. 15, for given parameters of lens radius (R), shade length (L), lens thickness (T), and index of refraction (n), FIG. 15 yields the following equations:

$$\gamma = \theta_r - \sin^{-1}(1/n \sin \theta_r) \qquad (8)$$

$$\tan(\xi) = \frac{R - r - T \sin \gamma}{L(1 - r^2/R^2)} \qquad (9)$$

$$\xi = \sin^{-1}(n \sin \gamma) \qquad (10)$$

where $\theta_r$ is the slope of a segment of lens 730′ at a given distance r from the center, $\gamma$ is the refracted angle of light within lens 730′, and $\xi$ as before is the final refracted angle of the light leaving lens 730′. From equations (8), (9), and (10), $\theta_r$ can be calculated as a function of r. As r increases, $\theta_r$ decreases and $\Delta r$ stays constant. For larger values of $\Delta r$, the light distribution on the shade 740 changes from uniform to bands of light and dark, or bands of high intensity and low intensity.

The example of a translucent cylinder has been used throughout most of this disclosure, but the target surface for light being refracted by the cuspate or Fresnel-cuspate lens could be a cone or an architectural surface such as walls of an atrium or other room. The light source could be a light bulb or sunlight, either collimated or diffuse, with appropriate adjustments being made in the lens profile calculations, as discussed for the point source.

The foregoing description is illustrative only, and various changes from the exemplary embodiments will occur to those in the art. It is intended that all such variations within the scope and spirit of the appended claims be embraced thereby.

We claim:

1. A multiple channel optical fiber coupler, comprising:
    first mounting means for receiving, on a reference axis, a transmissive end of a first optical fiber transmitting a first channel of data;
    second mounting means for receiving on said axis a transmissive end of a second optical fiber receiving said first channel of data;
    third mounting means for receiving on said axis a transmissive end of a third optical fiber for transmitting a second channel of data;
    fourth mounting means for receiving on said axis a transmissive end of a fourth optical fiber for receiving said second channel of data;
    first transmissive means including a refractive device for conservatively transmitting light from said first optical fiber in a geometric distribution about said axis;
    second transmissive means including a refractive device for receiving said geometrically distributed light and conservatively transmitting said light to said second optical fiber;
    third transmissive means including a refractive device for conservatively transmitting light along said axis from said third optical fiber; and
    fourth transmissive means including a refractive device for receiving said light from said third transmissive means and conservatively transmitting said light to said fourth optical fiber,
    wherein said third and fourth mounting means and said third and fourth transmissive means are located along said axis between said first and second transmissive means, and
    wherein said geometric light distribution surrounds said third mounting means, said third transmissive means, said fourth transmissive means, and said fourth mounting means.

2. The multiple channel optical fiber coupler of claim 1, further comprising:
    a first housing adapted to support said first and third mounting means and said first and third transmissive means;
    a second housing adapted to support said second and fourth mounting means and said second and fourth transmissive means; and
    wherein said geometric distribution is a circle and said first and second housings are rotatable with respect to each other about said axis.

3. The multiple channel optical fiber coupler of claim 1, wherein said refractive devices in said first and second transmissive means are cuspate lenses.

4. The multiple channel optical fiber coupler of claim 1, wherein said refractive devices in said first and second transmissive means are eccentric lenses.

5. The multiple channel optical fiber coupler of claim 1, wherein said refractive devices in said first and second transmissive means are axicons.

6. The multiple channel optical fiber coupler of claim 1, wherein said geometric light distribution includes a geometric shape of focused light.

7. The multiple channel optical fiber coupler of claim 1, wherein said geometric light distribution includes a geometrically shaped beam of parallel light.

8. A cuspate lens having a front surface extending radially from an axis to a periphery to receive light, said front surface being radially symmetric with respect to said axis and having a cusp and a maximum slope magnitude at said axis, a decreasing slope magnitude from said cusp to said periphery for refracting said light away from said axis, and a rear surface for transmitting said refracted light conservatively to a target surface away from said axis.

9. An optical fiber coupler, comprising:

means for receiving a transmissive end of a first optical fiber;

means for receiving transmissive ends of a plurality of second optical fibers in geometric arrangement and defining a border of a geometric shape with a border width corresponding to a transverse dimension of said second optical fibers; and means including a refractive device capable of producing a geometric light distribution for conservatively transmitting light between said end of said first optical fiber and said border of said geometric shape, said refractive device being a cuspate lens having a front surface extending from said axis to a periphery to receive light, said front surface being symmetric with respect to said axis and having a cusp and a maximum slope magnitude at said axis, and having a decreasing slope magnitude from said cusp to said periphery for refracting said light away from said axis, and a rear surface for transmitting said refracted light from said lens.

10. An optical fiber coupler, comprising:

means for receiving a transmissive end of a first optical fiber; means for receiving transmissive ends of a plurality of second optical fibers in geometric arrangement and defining a border of a geometric shape with a border width corresponding to a transverse dimension of said second optical fibers; and means including a refractive device which is an eccentric lens capable of producing a geometric light distribution for conservatively transmitting light between said end of said first optical fiber and said border of said geometric shape.

11. An optical fiber coupler, comprising:

means for receiving a transmissive end of a first optical fiber; means for receiving transmissive ends of a plurality of second optical fibers in geometric arrangement and defining a border of a geometric shape with a border width corresponding to a transverse dimension of said second optical fibers; and means including a refractive device which is an axicon capable of producing a geometric light distribution for conservatively transmitting light between said end of said first optical fiber and said border of said geometric shape.

12. An optical fiber coupler, comprising:

means for receiving a transmissive end of a first optical fiber, means for receiving transmissive ends of a plurality of second optical fibers in geometric arrangement and defining a border of a geometric shape with a border width corresponding to a transverse dimension of said second optical fibers;

means including a refractive device capable of producing a geometric light distribution for conservatively transmitting light between said end of said first optical fiber and said border of said geometric shape, said refractive device focusing said light at said border of said geometric shape;

a first housing adapted to support said first optical fiber receiving means and said refractive device;

a second housing adapted to support said second optical fiber receiving means; and wherein said geometric shape is a circle and said first and second housings are rotatable with respect to each other about said axis.

13. An optical fiber coupler, comprising:

means for receiving a transmissive end of a first optical fiber;

means for receiving transmissive ends of a plurality of second optical fibers in geometric arrangement and defining a border of a geometric shape with a border width corresponding to a transverse dimension of said second optical fibers;

means including a refractive device capable of producing a geometric light distribution for conservatively transmitting light between said end of said first optical fiber and said border of said geometric shape, said refractive device producing a geometrically shaped beam of parallel light illuminating said border of said geometric shape;

a first housing adapted to support said first optical fiber receiving means and said refractive device;

a second housing adapted to support said second optical fiber receiving means; and wherein said geometric shape is a circle and said first and second housings are rotatable with respect to each other about said axis.

14. A lamp apparatus for indirect lighting, comprising:

a light source; and a refractive device which can receive light from said light source and conservatively transmit said light to a target surface and which can exclude all such light from a desired dark area on the optical axis of said refractive device;

said target surface comprising a substantially translucent cylinder.

15. A lamp apparatus for indirect lighting, comprising:

a light source; and a refractive device which can receive light from said light source and conservatively transmit said light to a target surface and which can exclude all such light from a desire dark area on the optical axis of said refractive device;

said target surface comprising a substantially translucent truncated cone.

16. A lamp apparatus for indirect lighting, comprising:

a light source; and a refractive device which can receive light from said light source and conservatively transmit said light to a target surface and which can exclude all such light from a desired dark area on the optical axis of said refractive device; and wherein said refractive device is a cuspate lens having a front surface extending radially from an axis to a periphery to receive said light, said front surface being radially symmetric with respect to said axis and having a cusp and a maximum slope magnitude at said axis, a decreasing slope magnitude from said cusp to said periphery for refracting said light away from said axis, and a rear surface for transmitting said refracted light conservatively to said target surface.

17. A lamp apparatus for indirect lighting, comprising:

a light source;

a refractive device which can receive light from said light source and conservatively transmit said light to a target surface and which can exclude all such light from a desired dark area on the optical axis of said refractive device; and wherein said refractive device is a lens having a multi-faceted front surface consisting of concentric rings sloped toward an axis at the center of said lens, each ring a smaller slope than the nest innermost ring, so that incident light is refracted away from said axis, and having a rear surface for transmitting said refracted light conservatively to said target surface.

18. A lamp apparatus for indirect lighting, comprising:
a light source; and
a refractive device having an optical axis and which can receive light from said light source and conservatively transmit substantially all of said light to a cylindrical target surface having inner walls parallel to said optical axis of said refractive device and which can exclude all such light from a desired dark area on the optical axis of said refractive device.

19. The lamp apparatus of claim 18 wherein said target surface comprises an architectural surface.

20. An optical fiber coupler, comprising:
means for receiving a transmissive end of a single first optical fiber,
means for receiving transmissive ends of a plurality of second optical fibers in geometric arrangement and defining a border of a geometric shape with a border width corresponding to a transverse dimension of said second optical fibers; and
means including a single lens refractive device capable of producing a geometric light distribution for conservatively transmitting light between said end of said first optical fiber and said border of said geometric shape.

21. The coupler of claim 20, wherein said geometric shape is a circle.

22. The coupler of claim 20, wherein said geometric shape is a rectangle.

23. The coupler of claim 20, wherein said transmission means includes: means
for spreading light transmitted from said end of said first fiber into a beam of enlarged cross-section of light oriented parallel with respect to a reference axis.

24. The coupler of claim 23, wherein said spreading means comprises a device with a refractive index gradient.

25. The coupler of claim 20, wherein said refractive device focuses said light at said border of said geometric shape.

26. The coupler of claim 23, wherein said refractive device produces a geometrically shaped beam of parallel light illuminating said border of said geometric shape.

27. The coupler of claim 23, wherein said spreading means comprises a pair of biconvex lenses.

* * * * *

UNITED STATES PATENT AND TRADEMARK OFFICE
CERTIFICATE OF CORRECTION

PATENT NO. : 4,961,622

DATED : OCTOBER 9, 1990

INVENTOR(S) : MICHAEL A. GORMAN; MARK H. STERLING; ROBERT M. KIEHN AND LOWELL T. WOOD

It is certified that error appears in the above-identified patent and that said Letters Patent is hereby corrected as shown below:

Claim 9 (Col. 15, line 14)
    between "receive" and "light" insert --said--

Claim 17 (Col. 17, line 4)
    between "ring" and "a" insert --having--

Signed and Sealed this

Seventh Day of January, 1992

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,961,622

DATED : October 9, 1990

INVENTOR(S) : Michael A. Gorman; Mark H. Sterling; Robert M. Kiehn; and Lowell T. Wood It is certified that error appears in the above-identified patent and that said Letters Patent is hereby corrected as shown below:

At Column 1 after the title of the invention insert:

-- This invention was made with Government support under Contract N00014-85-K-0623 awarded by the Department of the Navy. The Government has certain rights in this invention. --

Signed and Sealed this

Fifteenth Day of September, 1992

*Attest:*

DOUGLAS B. COMER

*Attesting Officer*     *Acting Commissioner of Patents and Trademarks*